US012005471B2

(12) United States Patent
Hayes et al.

(10) Patent No.: US 12,005,471 B2
(45) Date of Patent: Jun. 11, 2024

(54) SYSTEM WITH SEALING CHAMBER

(71) Applicant: Kompac Technologies, LLC, Somerville, NJ (US)

(72) Inventors: Colin Hayes, Weehawken, NJ (US); Thomas Hayes, Flemington, NJ (US)

(73) Assignee: Kompac Technologies, LLC, Somerville, NJ (US)

( * ) Notice: Subject to any disclaimer, the term of this patent is extended or adjusted under 35 U.S.C. 154(b) by 0 days.

(21) Appl. No.: 18/128,222

(22) Filed: Mar. 30, 2023

(65) Prior Publication Data

US 2023/0234092 A1 Jul. 27, 2023

Related U.S. Application Data

(63) Continuation of application No. PCT/US2022/047869, filed on Oct. 26, 2022.

(60) Provisional application No. 63/272,401, filed on Oct. 27, 2021.

(51) Int. Cl.

*B05C 1/08* (2006.01)
*B05C 11/115* (2006.01)
*B05C 1/10* (2006.01)

(52) U.S. Cl.

CPC .......... *B05C 11/115* (2013.01); *B05C 1/0808* (2013.01); *B05C 1/0813* (2013.01); *B05C 1/0834* (2013.01); *B05C 1/0865* (2013.01); *B05C 1/0817* (2013.01); *B05C 1/10* (2013.01)

(58) Field of Classification Search

CPC ... B05C 11/115; B05C 1/0808; B05C 1/0813; B05C 1/10; B05C 1/0817; B05C 1/0865; B05C 1/0834; B05C 1/086; B05C 11/042; B05C 11/044; B05C 11/045; B05C 11/047; B05C 5/0262; B41F 9/1063; B41F 31/025; B41F 9/1072; B41F 9/1081; B41F 19/001; B41F 19/002; B41F 31/027; B41F 7/26

USPC .......................................... 118/255, 211, 212

See application file for complete search history.

(56) References Cited

U.S. PATENT DOCUMENTS 3,769,909 A * 11/1973 Fugman .................... B41F 7/26 101/148
4,455,938 A * 6/1984 Loudon ..................... B41F 7/32 101/148
5,239,925 A * 8/1993 Bobo .................... B41F 31/027 101/169
5,335,596 A 8/1994 Demoore et al.
5,355,799 A * 10/1994 Lutz ....................... B05C 1/0813 101/350.1
5,667,589 A * 9/1997 Mailander ............. B05C 1/0813 15/256.51
5,671,673 A * 9/1997 Boose ................... B41F 31/027 101/363

(Continued)

OTHER PUBLICATIONS

DE3924273, Mosburger et al, Glue Application Appts. Has Dosing Roller Scraper Covered By Glue to Give Wet Cleaning Action, published Jan. 31, 1991. (Year: 1991).*

(Continued)

*Primary Examiner* — Binu Thomas
(74) *Attorney, Agent, or Firm* — Myers Wolin, LLC

(57) ABSTRACT

A system may include: a coating form roller; a metering roller adjacent to the coating form roller; and a sealing chamber. The sealing chamber may include first and second blades that engage with the coating form roller and the metering roller, respectively.

21 Claims, 17 Drawing Sheets

(56) References Cited

U.S. PATENT DOCUMENTS

| | | | | |
|---|---|---|---|---|
| 5,983,791 | A * | 11/1999 | Wall | B41F 7/32 101/350.1 |
| 6,796,228 | B2 * | 9/2004 | Goodwin | B41F 7/40 101/148 |
| 2008/0295718 | A1 * | 12/2008 | Kleinschnitz | B41F 31/027 101/350.6 |
| 2009/0050054 | A1 | 2/2009 | Oldorff et al. | |
| 2011/0195193 | A1 * | 8/2011 | Oster | B05C 1/0834 118/200 |
| 2012/0318193 | A1 * | 12/2012 | Specht | B05C 1/0813 118/202 |

OTHER PUBLICATIONS

English translation, description only, DE3924273, Mosburger et al, Glue Application Appts. Has Dosing Roller Scraper Covered By Glue to Give Wet Cleaning Action, published Jan. 31, 1991. (Year: 1991).*

Notification of Transmittal of The International Search Report and Written Opinion issued by the International Searching Authority for International Patent Application No. PCT/US22/47869, dated Jan. 27, 2023.

* cited by examiner

COATING MACHINE FOR APPLICATION OF PRIMERS AND COATINGS FOR INKJET PRINTING AND HEAT SEAL BARRIER PACKAGING - SHEET VERSION

COATING MACHINE FOR APPLICATION OF PRIMERS AND COATINGS FOR INKJET

SYSTEM WITH SEALING CHAMBER

CROSS-REFERENCE TO RELATED APPLICATIONS

This application is a continuation of International Patent Application No. PCT/US2022/047869, filed Oct. 26, 2022, which takes priority from U.S. Provisional Applications No. 63/272,401, filed Oct. 27, 2021, and 63/344,838, filed May 23, 2022, the contents of each of which are incorporated by reference herein in their entirety.

FIELD

The present disclosure generally relates to a system with a sealing chamber. One example of the present disclosure relates to a coating machine that can apply specialized primers and various barrier coatings (oil barrier, water barrier, oxygen barrier, heat seal and others) to web or sheet substrates in specific critical film thicknesses which can be applied from one or multiple coating heads to achieve the required film thickness. The system also utilizes associated drying and cooling devices and monitoring systems for maintaining consistent film thickness and proper drying of the materials.

The system may be a modular system in which the sealing chamber can be utilized interchangeably, or in addition to other interchangeable modules.

BACKGROUND

Inkjet—Traditionally pre-primed substrates for inkjet printing have been purchased from manufacturers with very large machines that utilize a Meyer rod or gravure type coating system to flood the substrate in one pass, then utilize a long oven for drying. These substrates are produced in large rolls then cut to smaller sizes for general use. The variety of available substrates is limited and pricing is substantial. Lead times are also extensive. The market seeks a smaller priming system which print shops can utilize to treat their own substrates, on-demand.

Barrier Coating—The current climate in the global packaging market is focused on reducing the use of plastics in packaging. European countries are soon outlawing the use of plastics. This has led to a need for paper based sustainable packaging. Traditional methods of applying coatings (flexo coaters, roll coaters, anilox coaters) have failed as they cannot reach the required coating thickness in one pass and drying these coatings in difficult. The coating must provide a strong water/liquid/oxygen barrier as well as be glueable.

Traditionally, anilox systems have been designed with a chambered doctor blade configuration mounted above an anilox roller which provides a specific, fixed amount of coating film thickness to the substrate. This film thickness can only be changed by replacing the anilox roller with a roller having a different engraving pattern. This becomes costly as many different anilox rollers must be purchased for each required film thickness and these rollers are expensive. Also, changing these rollers adds to make ready times which delays production, causing more cost increases.

Thus, the inventor(s) has recognized that there is a need for a new system that is used for applying coating solution. In addition, the inventor(s) has recognized that there is a need for preventing coating solution on a roller from drying when the system is operated.

The description provided in the background section should not be assumed to be prior art merely because it is mentioned in or associated with the background section. The background section may include information that describes one or more aspects of the subject technology.

SUMMARY

One embodiment of the present disclosure can provide a system. The system may include: a coating form roller; a metering roller adjacent to the coating form roller; and a sealing chamber. The sealing chamber may include first and second blades that engage with the coating form roller and the metering roller, respectively.

In some examples, the first and second blades, the coating form roller, and the metering roller seal the sealing chamber.

In some examples, the first blade is tilted to the second blade.

In some examples, each of the first blade and the second blade is tilted to a vertical direction at angles depending upon the diameters of the coating form roller and the metering roller.

In some examples, the first blade and the second blade are tilted to a vertical direction at different angles, and the diameters of the coating form roller and the metering roller are different.

In some examples, the first blade and the second blade form a linear opening extending along a nip between the coating form roller and the metering roller.

In some examples, the sealing chamber further comprises a first end seal on the coating form roller and the metering roller and at a first end of the sealing chamber.

In some examples, the sealing chamber further comprises a second end seal on the coating form roller and the metering roller and at a second end of the sealing chamber opposite the first end.

In some examples, the sealing chamber comprises a first outer end seal located at a first end of the coating form roller, and sealing against a radial surface of the metering roller.

In some examples, the sealing chamber comprises a second outer end seal that is located at a second end of the coating form roller, and sealing against the radial surface of the metering roller.

In some examples, the sealing chamber includes a first blade clamp and a second blade clamp that extend along an axis direction of the coating form roller. The first blade is provided on the first blade clamp, and the second blade is provided on the second blade clamp.

In some examples, the sealing chamber includes a chamber body that extends along the axial direction.

In some examples, the system further includes a metering system configured to control pressure between the coating form roller and the metering roller such that a thickness of coating solution around the coating form roller is controlled.

In some examples, the system further includes a pumping system fluidly connected to the sealing chamber.

In some examples, the pumping system includes: a first pump configured to feed coating solution into the sealing chamber from a container, and a second pump configured to suck coating solution from the sealing chamber into the container.

In some examples, the sealing chamber includes at least one fluid port. The pumping system is fluidly connected to the sealing chamber via the at least one fluid port.

In some examples, the metering roller is a hard surface roller.

In some examples, the metering roller is an anilox roller.

In some examples, wherein the first and second blades are tangential to the coating form roller and the metering roller, respectively.

In some examples, the sealing chamber is defined at least partially by the first and second blades, the coating form roller, the metering roller, and at least one end seal contacting each of the coating form roller and the metering roller.

In some examples, the sealing chamber is further defined by a chamber body. The chamber body has a retention mechanism by which the first and second blades are retained by the chamber body.

In some examples, the sealing chamber has a first end and a second end in an axial direction. The at least one end seal includes: an end seal at each of the first and second end sealing the first blade to the second blade thereby forming a trough defined by the end seals, the first blade, and the second blade; and an outer end seal at each of the first and second end sealing the coating form roller to the metering roller thereby forming a lower chamber below the trough. The trough has a lower opening between the first blade and the second blade extending in the axial direction, such that coating solution in the trough passes through the lower opening to the lower chamber.

In some examples, the outer end seal at each of the first and second end is pressed against a corresponding end of the coating form roller and is pressed against a corresponding radial surface of the metering roller by a torsional spring.

DRAWINGS

EMBODIMENTS

Figure 1:
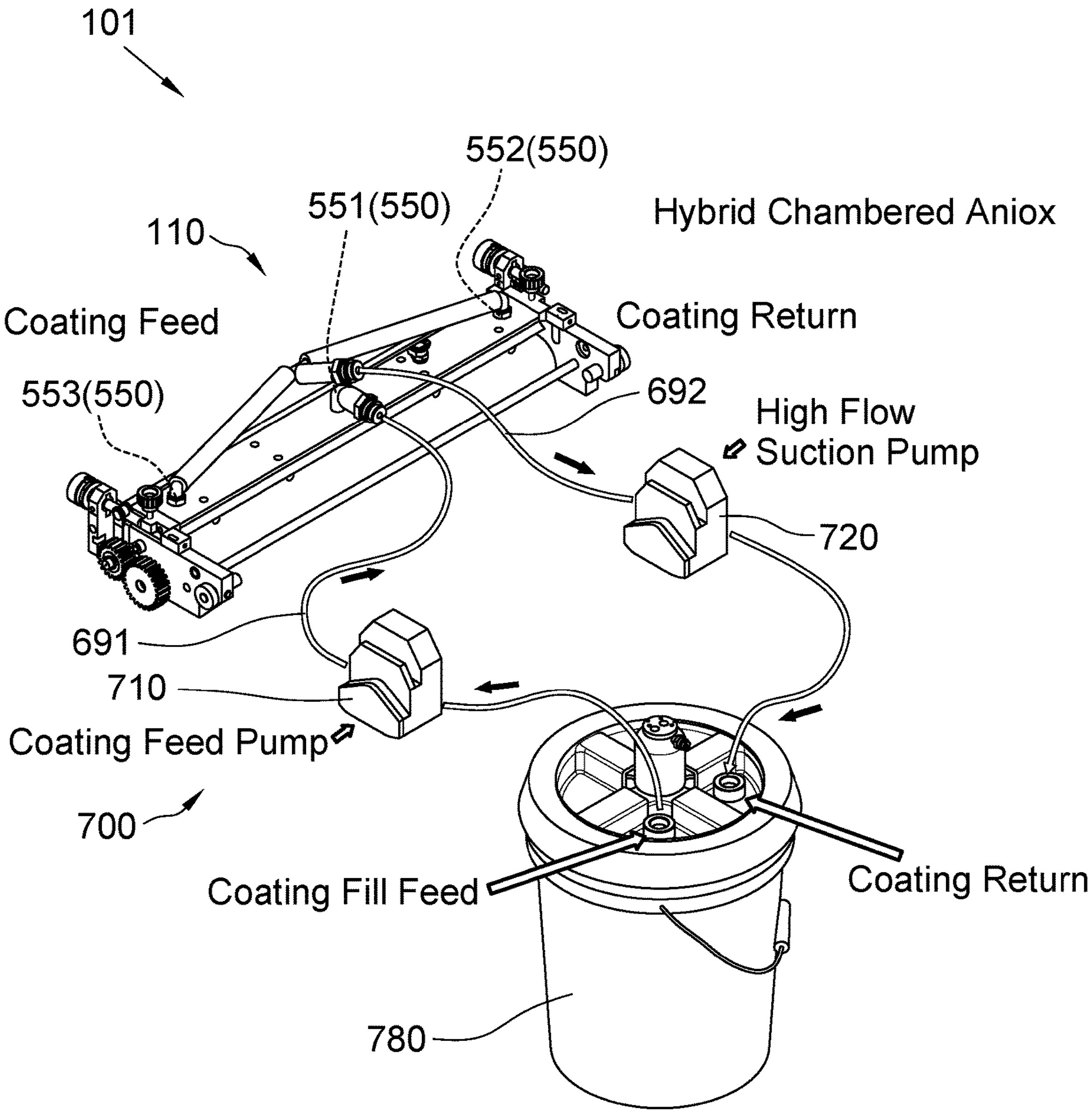
FIG. 1 is a perspective view of a system according to some embodiments.

The description of illustrative embodiments according to principles of the present disclosure is intended to be read in connection with the accompanying drawings, which are to be considered part of the entire written description. In the description of embodiments of the disclosure disclosed herein, any reference to direction or orientation is merely intended for convenience of description and is not intended in any way to limit the scope of the present disclosure. Relative terms such as "lower," "upper," "horizontal," "vertical," "above," "below," "up," "down," "top" and "bottom" as well as derivative thereof (e.g., "horizontally," "downwardly," "upwardly," etc.) should be construed to refer to the orientation as then described or as shown in the drawing under discussion. These relative terms are for convenience of description only and do not require that the apparatus be constructed or operated in a particular orientation unless explicitly indicated as such. Terms such as "attached," "affixed," "connected," "coupled," "interconnected," and similar refer to a relationship wherein structures are secured or attached to one another either directly or indirectly through intervening structures, as well as both movable or rigid attachments or relationships, unless expressly described otherwise. Moreover, the features and benefits of the disclosure are illustrated by reference to the exemplified embodiments. Accordingly, the disclosure expressly should not be limited to such exemplary embodiments illustrating some possible non-limiting combination of features that may exist alone or in other combinations of features; the scope of the disclosure being defined by the claims appended hereto.

This disclosure describes the best mode or modes of practicing the disclosure as presently contemplated. This description is not intended to be understood in a limiting sense, but provides an example of the disclosure presented solely for illustrative purposes by reference to the accompanying drawings to advise one of ordinary skill in the art of the advantages and construction of the disclosure. In the various views of the drawings, like reference characters designate like or similar parts.

It is important to note that the embodiments disclosed are only examples of the many advantageous uses of the innovative teachings herein. In general, statements made in the specification of the present application do not necessarily limit any of the various claimed disclosures. Moreover, some statements may apply to some inventive features but not to others. In general, unless otherwise indicated, singular elements may be in plural and vice versa with no loss of generality.

Some embodiments of the present disclosure can provide a coating system that includes two rollers and a sealing chamber. The two of the rollers may include a metering roller that can be of anilox design or made of other materials. The two rollers can be operated with the sealing chamber arranged over the nip between the two rollers. The sealing chamber may include one or more blades. In some embodiments, the blades may include doctor blade, and in other embodiments, the blade may not be a doctor blade. The sealing chamber may function as a chambered recirculating feed system. The blades, which may be doctor blades (e.g., containment blades), may be utilized to enclose the coating solution on top of the roller (e.g., the metering roller) to prevent drying in the system. End seals may be mounted on the ends of the rollers creating a dam affect so that the coating solution can stay contained in the nip of the coater. The end seals may also be utilized on the ends of the chamber to enclose the coating in the chamber. Metering devices may be utilized to adjust the pressure between the two rollers which allows for a wide variation of the coating film thicknesses. Pumping system may be incorporated to produce the correct amount of coating flow to and from the sealing chamber.

Some embodiments of a system, which may be a coating system, may include a two-roll seal type dampener (Coater) (disclosed in U.S. Pat. No. 4,455,938 to Loudon, which is incorporated by reference in its entirety herein). Some embodiments of the system can utilize a one-way feed of coating to the coating nip or a recirculating configuration with the chambered doctor blade attachment. The two-roll system may also utilize an end seal carrier assembly (disclosed in U.S. Pat. No. 5,983,791 to Wall, which is incorporated by reference in its entirety herein), or a compression/extension spring sealing system (disclosed in U.S. Pat. No. 4,455,938 to Loudon) which creates a dam effect for the coating liquid. The modular system can be configured in a variety of ways for each specific application. The coater also can be configured with a modular chambered doctor blade feed/containment system which sits above the two-roll system with the doctor blades in contact with the anilox (or other material) metering roller depending upon the job requirements (may be required for fast drying aqueous coatings or for higher coating thicknesses). The system can be automated and adjusted via servo motors controlling the coating film thickness via the Dampening Metering Device (disclosed in U.S. Pat. No. 6,796,228 to Wall, which is incorporated by reference in its entirety herein). The coating may be recirculated through the chambered doctor blade system and back to the coating container via two adjustable pumps which provide the optimum flow rate to prevent coating starvation and to prevent leaking. The entire coating module can be configured as a cassette for easy removal for cleaning or changing to different coating units.

Figure 2:
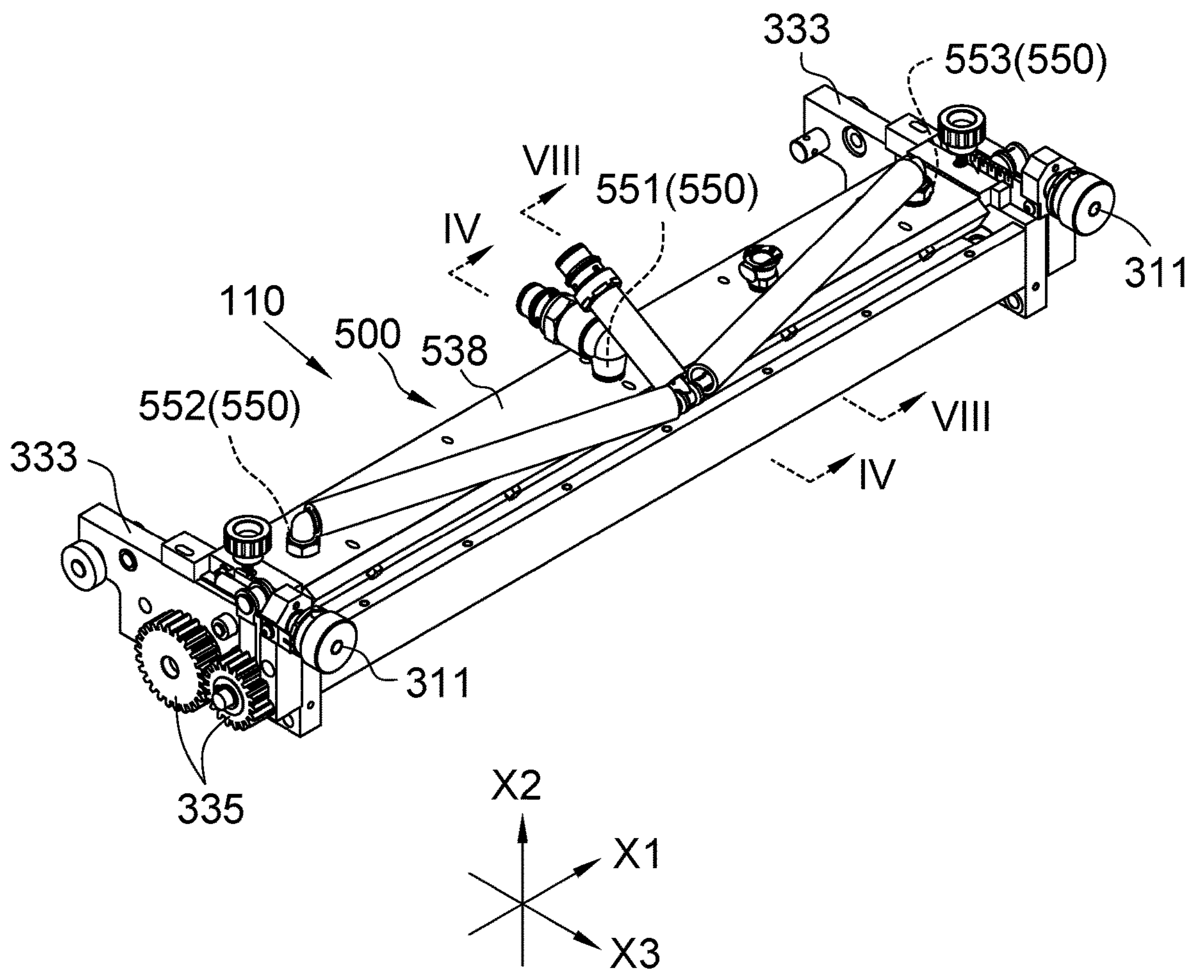
FIG. 2 is a perspective view of a coating unit according to some embodiments.
Figure 3A:
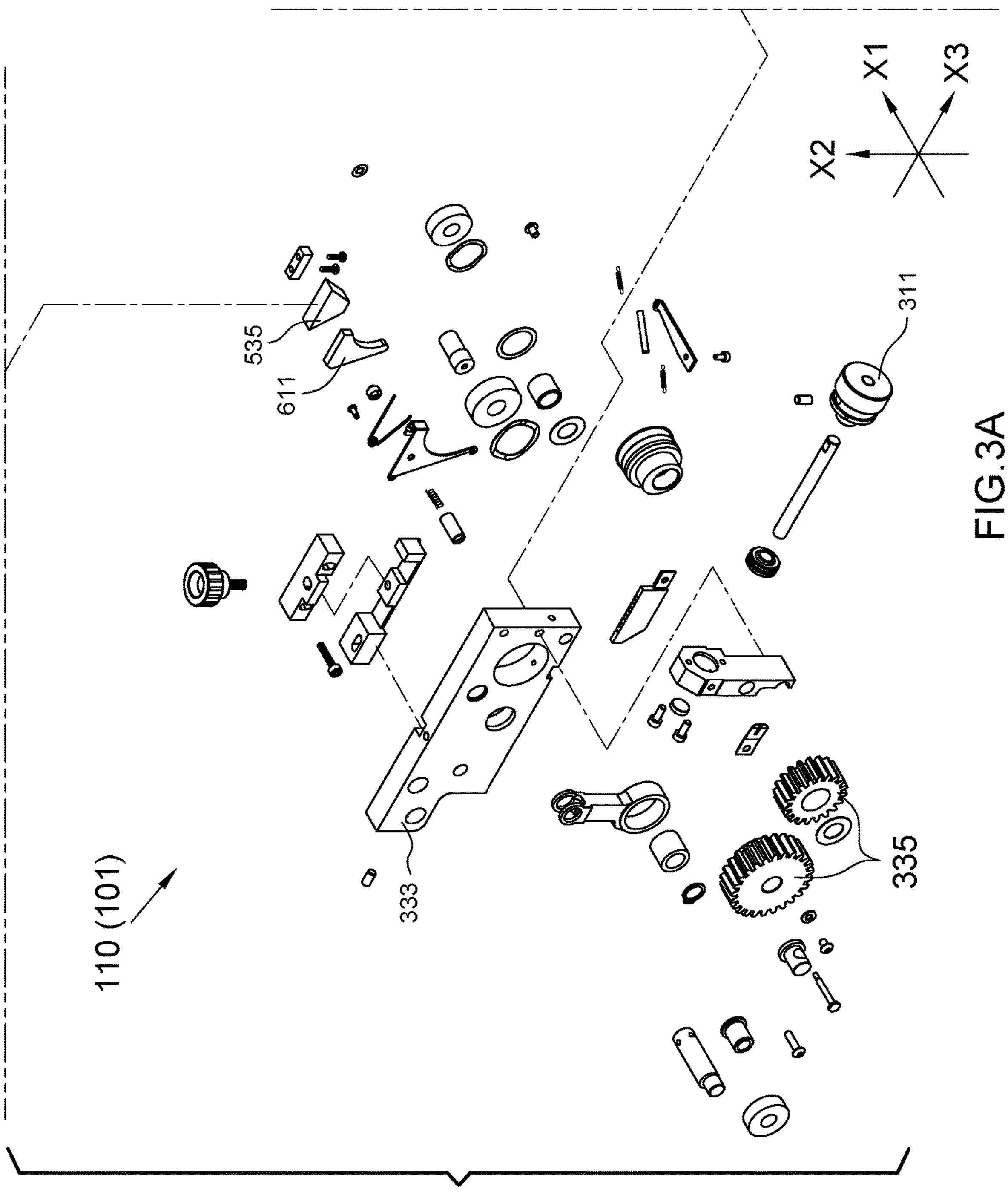
FIGS. 3A-3D illustrate exploded perspective views of a coating unit according to some embodiments.
Figure 3B:
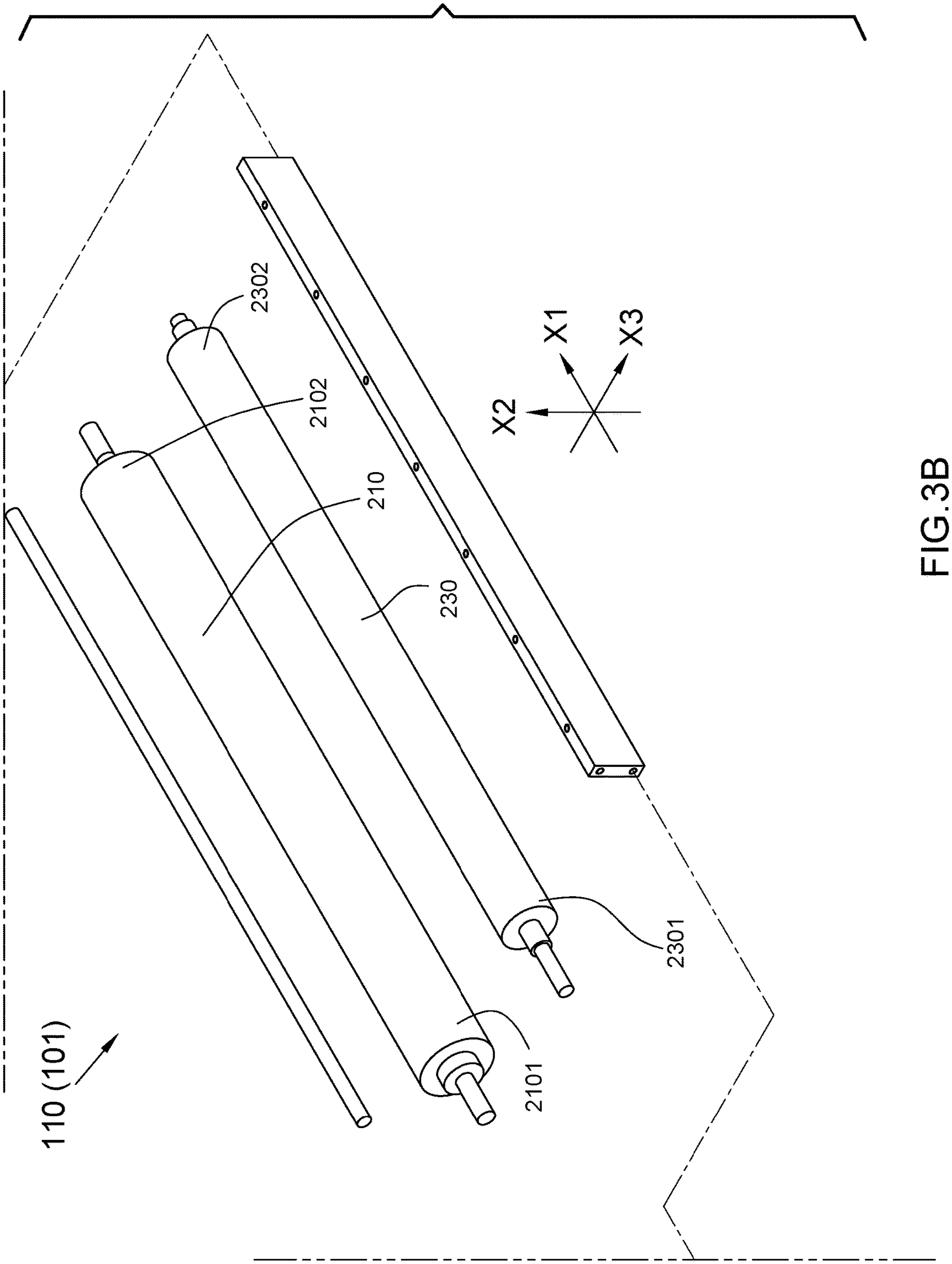
Figure 3C:
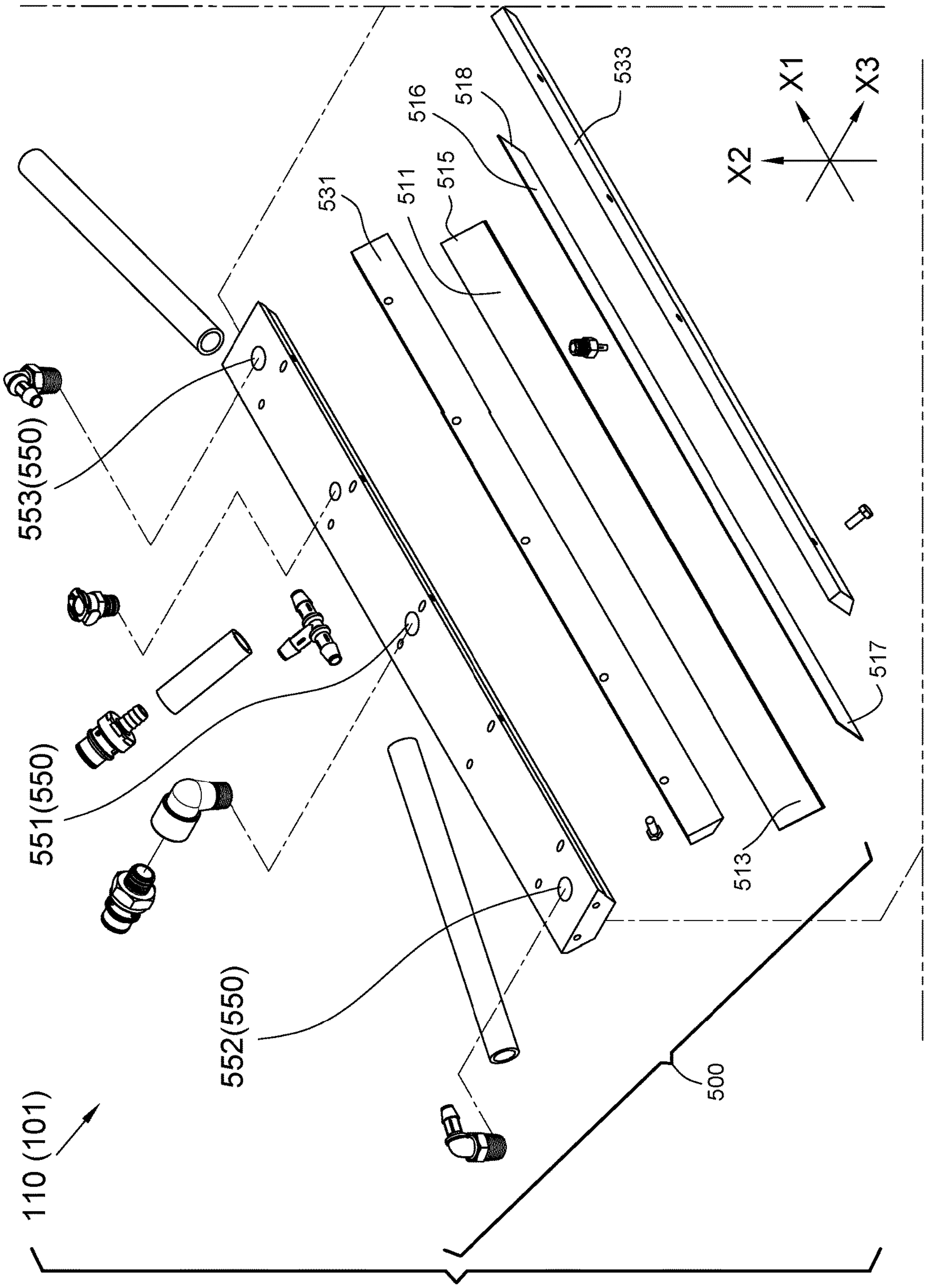
Figure 3D:
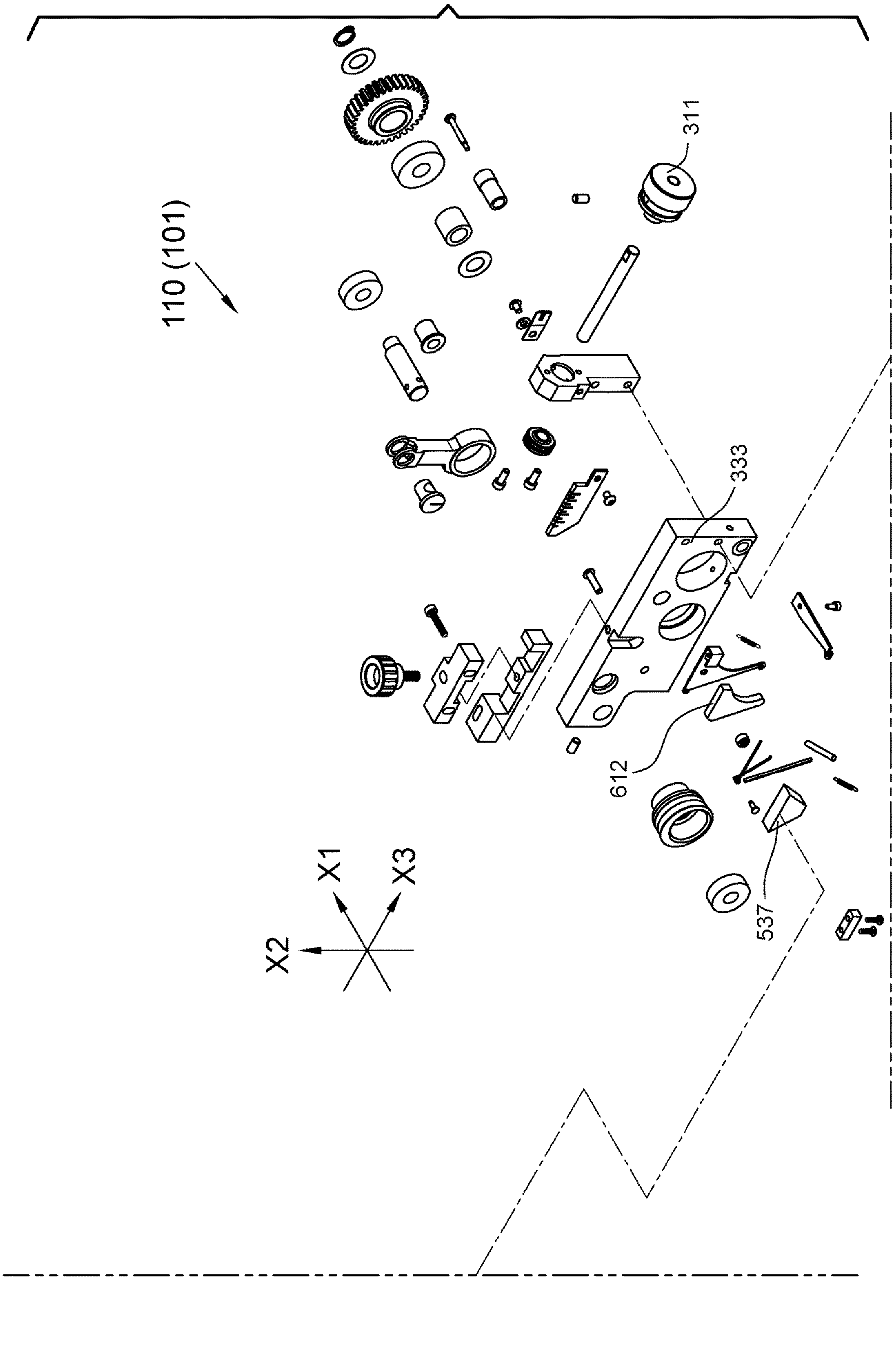
Figure 4:
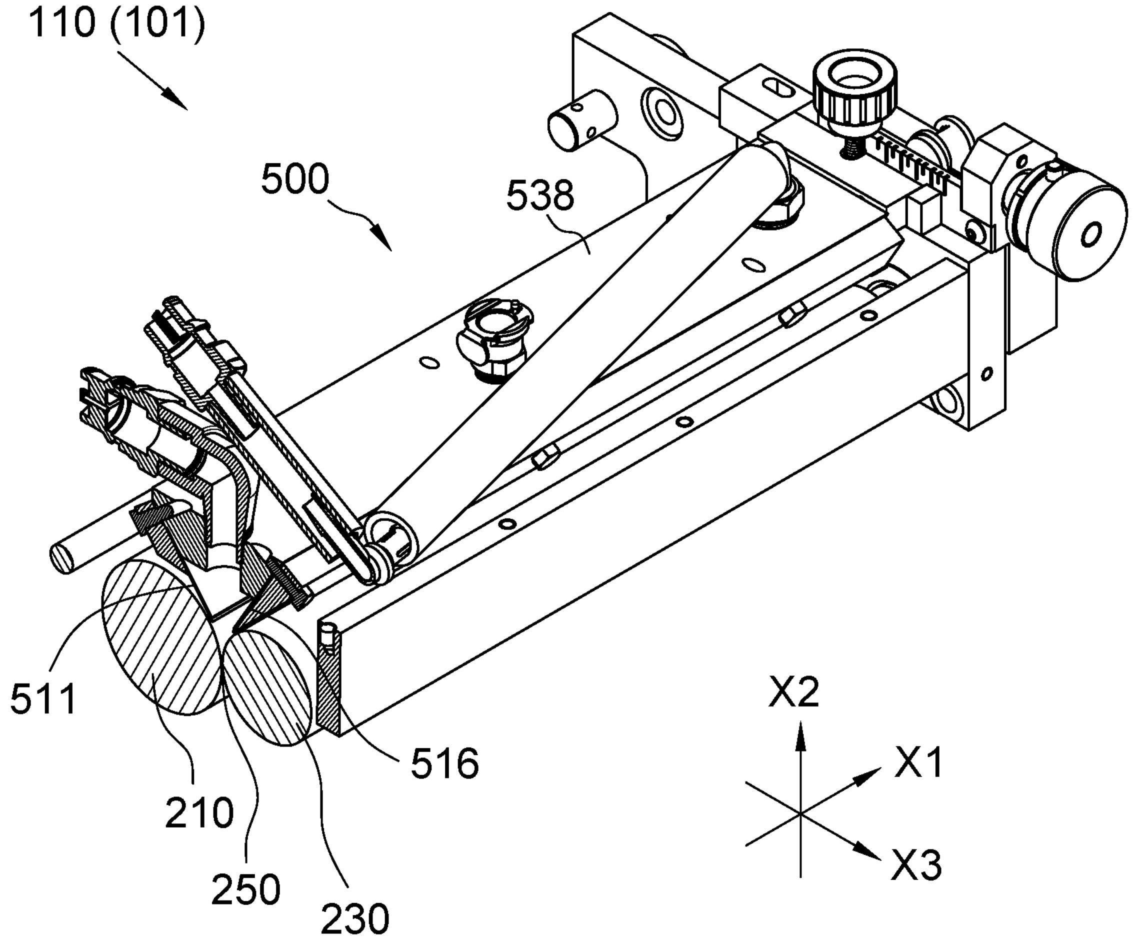
FIG. 4 is a cross sectional view taken along line IV-IV in FIG. 2.

FIG. 1 is a perspective view of a system 101 according to some embodiments. The system 101 may include a coating unit 110. FIG. 2 is a perspective view of the coating unit 110 according to some embodiments. FIG. 3 is an exploded perspective view of the coating unit 110 according to some embodiments. FIG. 4 is a cross sectional view taken along line IV-IV in FIG. 2.

With reference to FIGS. 2-4, the coating unit 110 may include a coating form roller 210, a metering roller 230, a metering system 311, a plurality of supports 333, a plurality of gears 335, and a sealing chamber 500.

Figure 5:
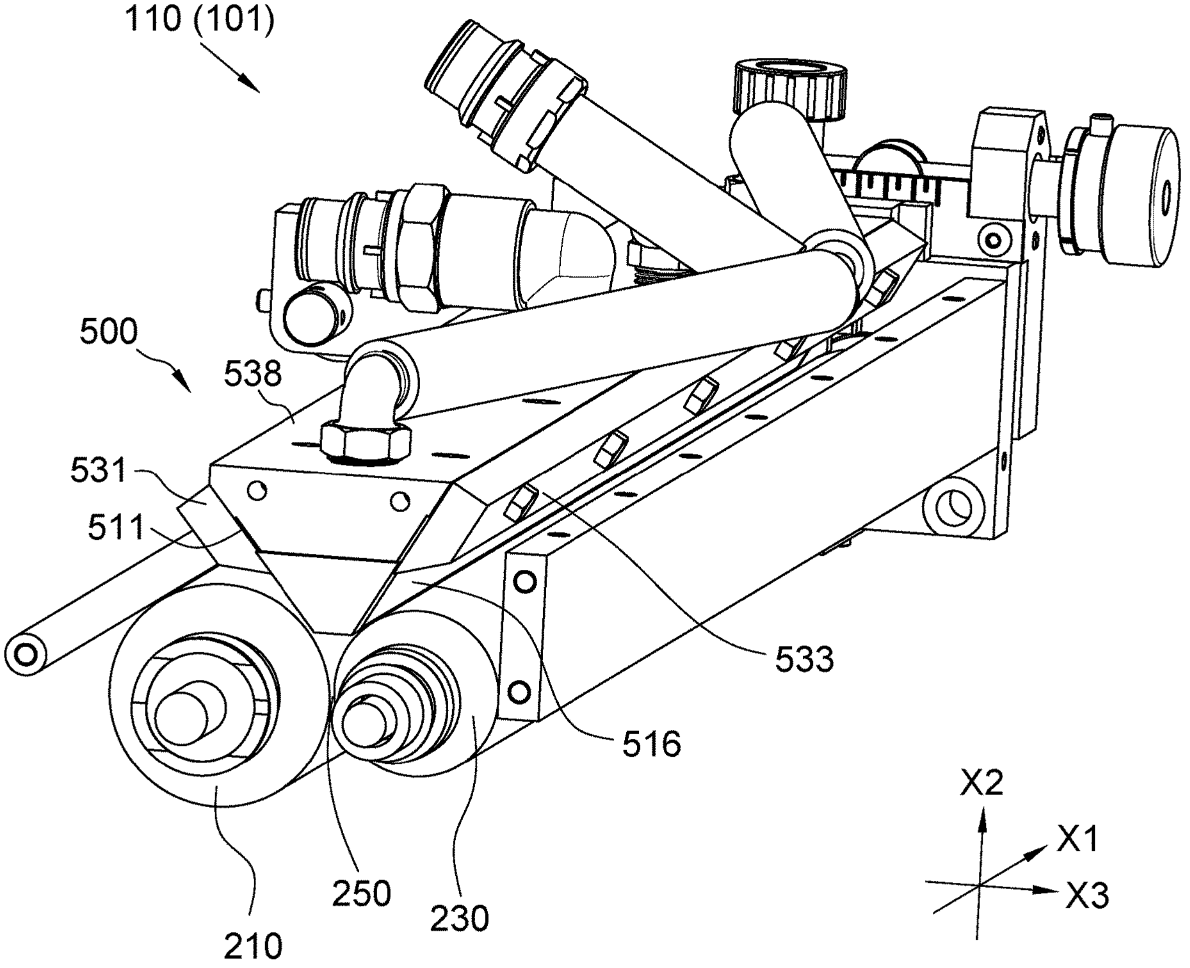
FIG. 5 is a perspective view of a part of a coating unit according to some embodiments.
Figure 6:
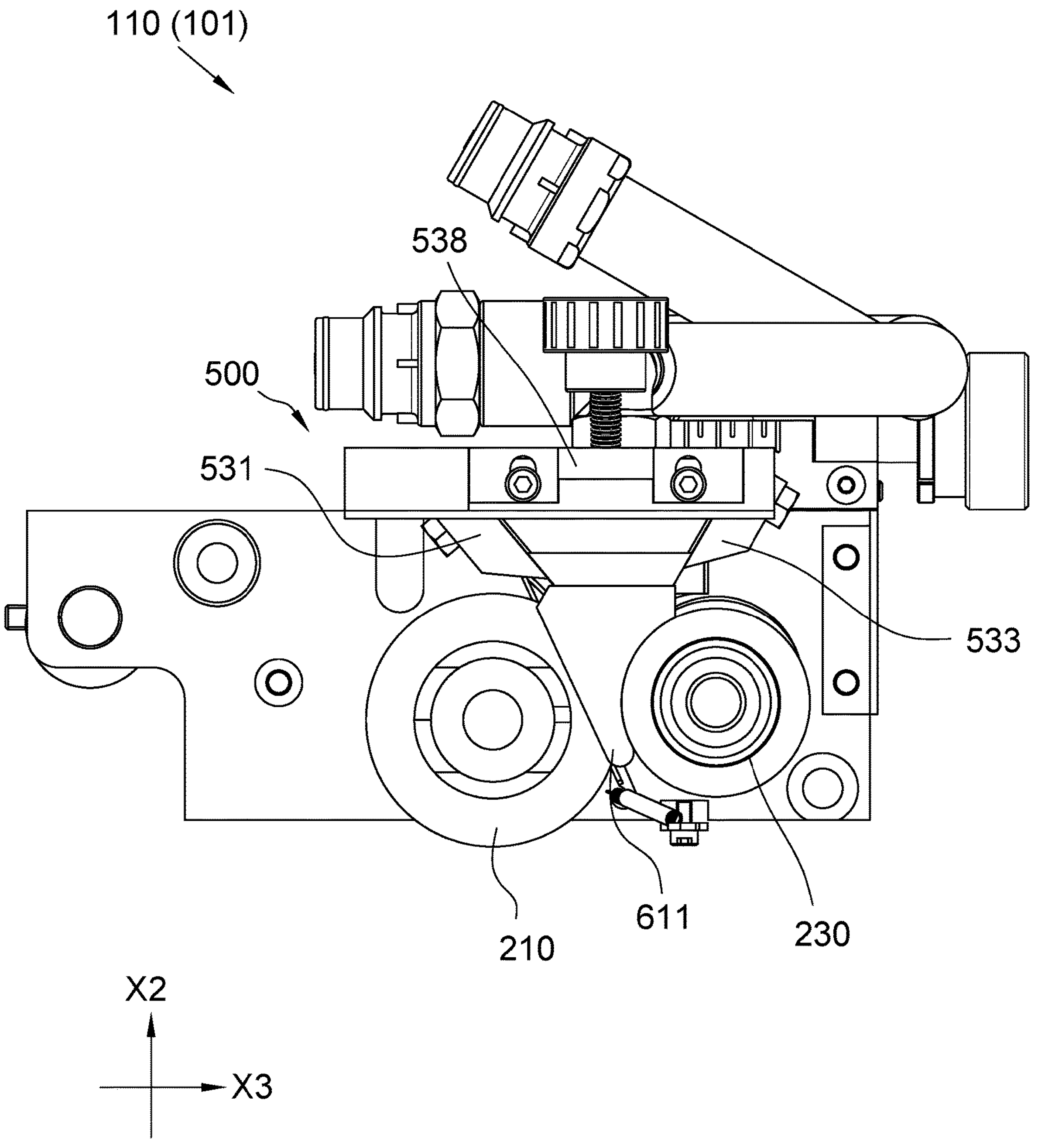
FIG. 6 is a side view of a part of a coating unit according to some embodiments.
Figure 7:
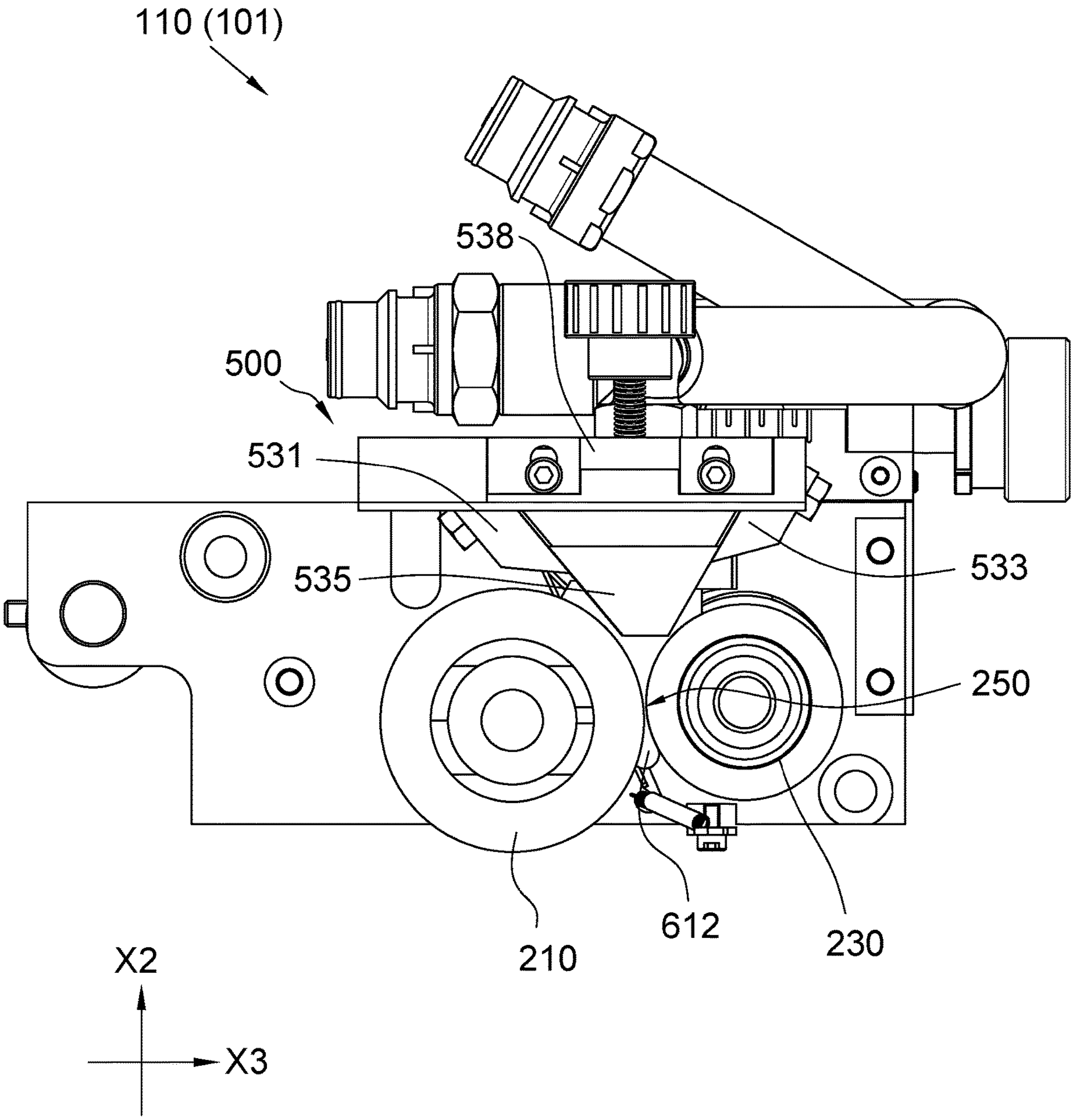
FIG. 7 is a side view of a part of a coating unit according to some embodiments.
Figure 8:
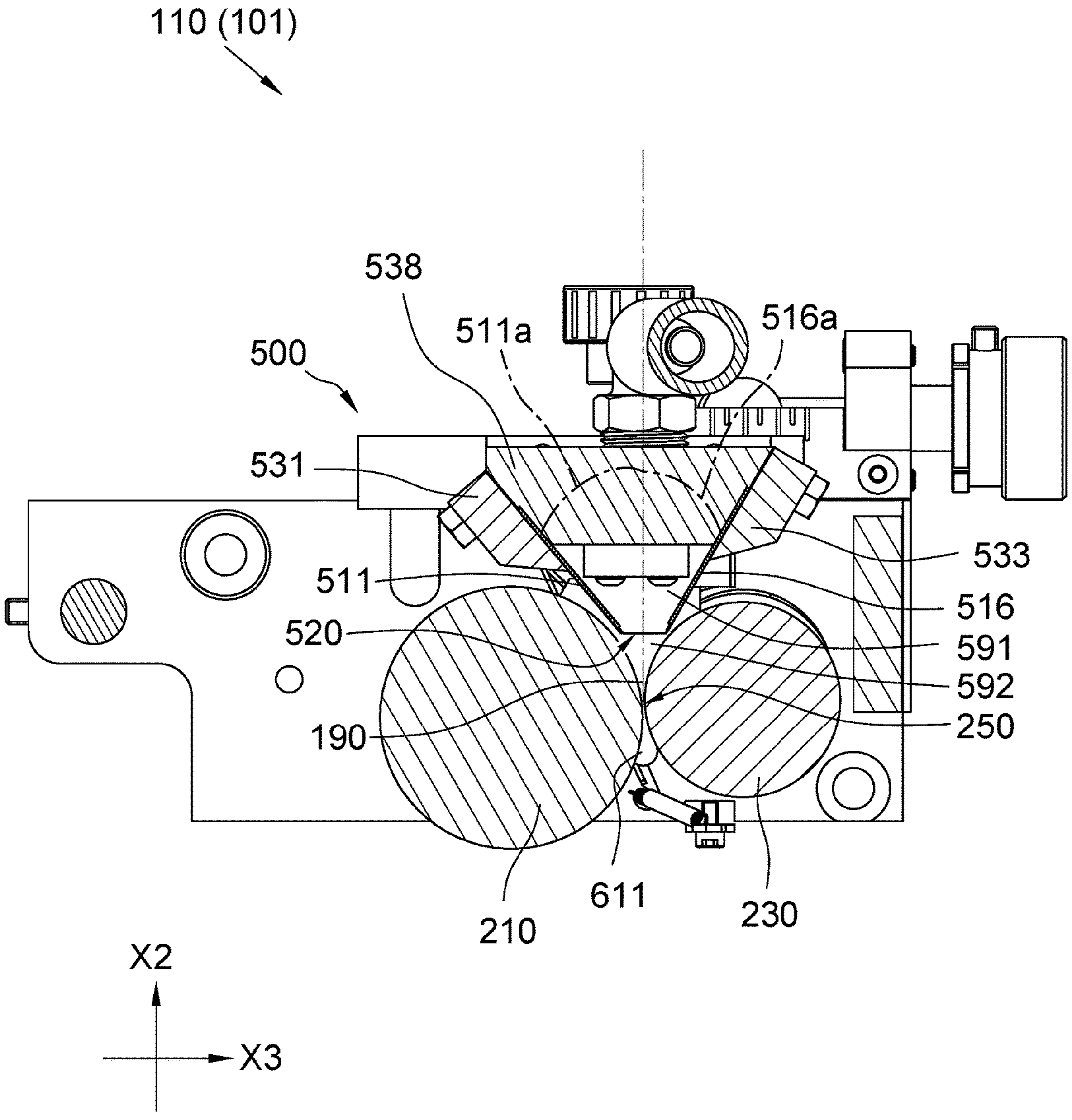
FIG. 8 is a cross sectional view taken along line VIII-VIII in FIG. 2.
Figure 9:
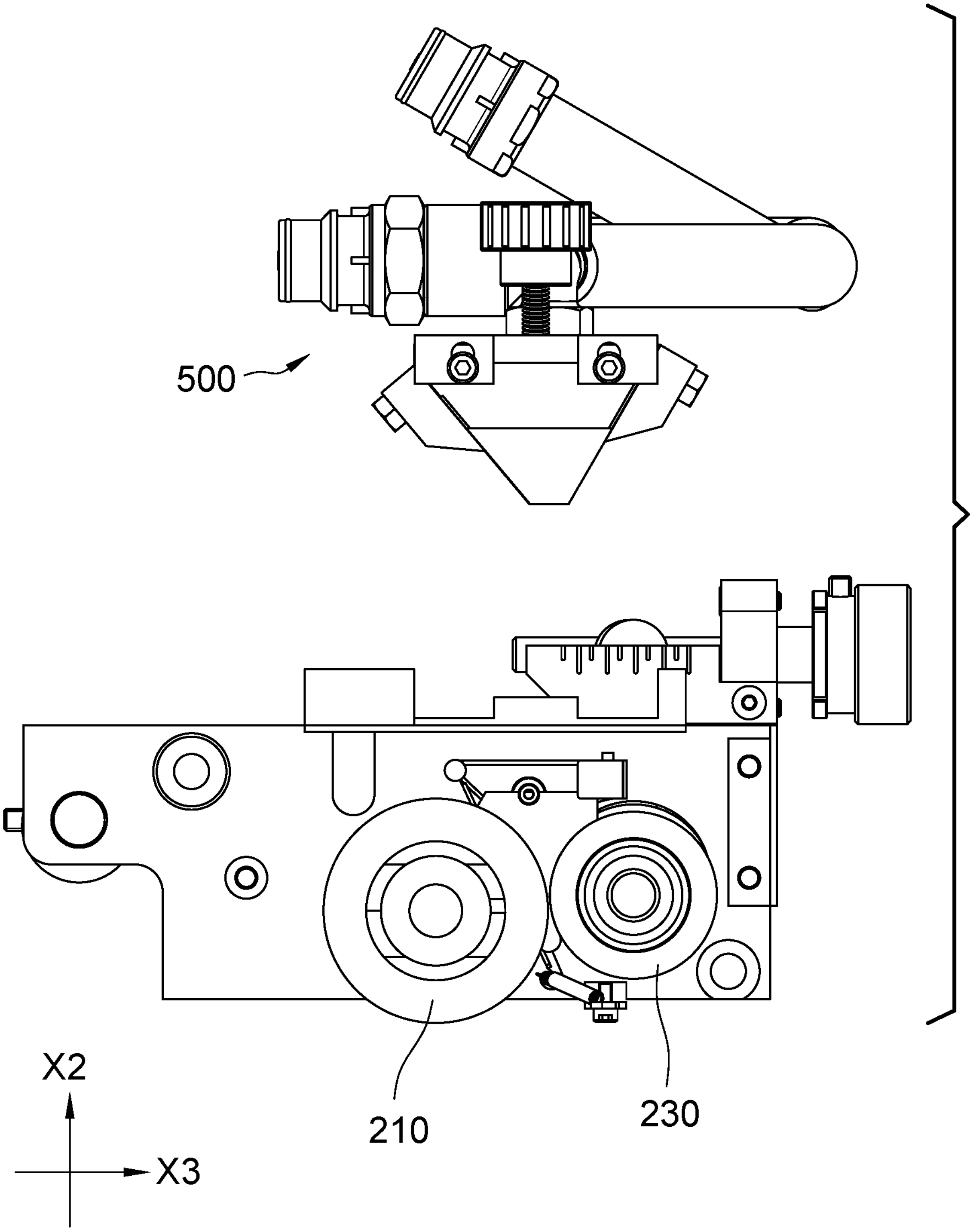
FIG. 9 is a partially exploded side view of a coating unit according to some embodiments.
Figure 10:
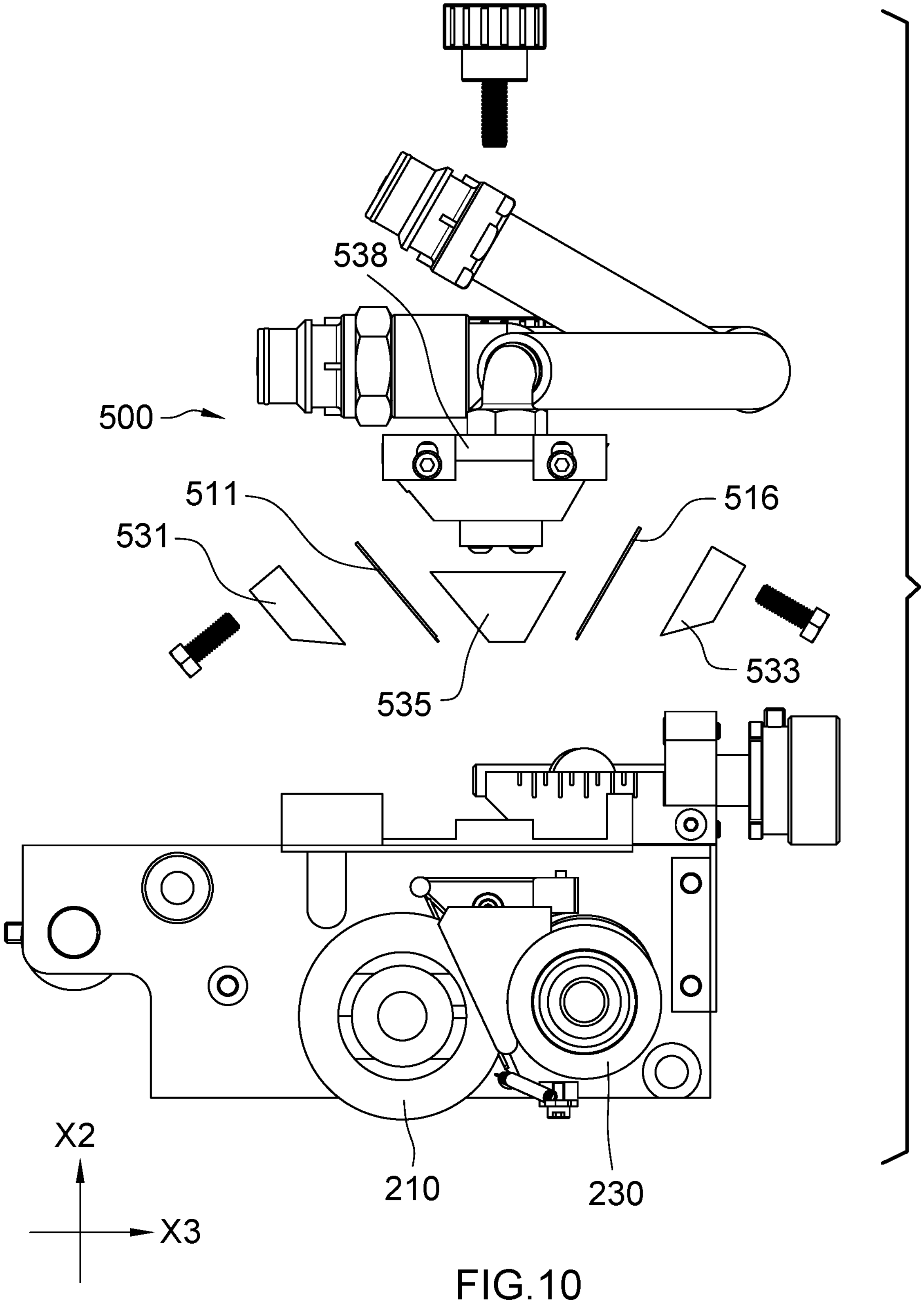
FIG. 10 is a partially exploded side view of a coating unit according to some embodiments.
Figure 11:
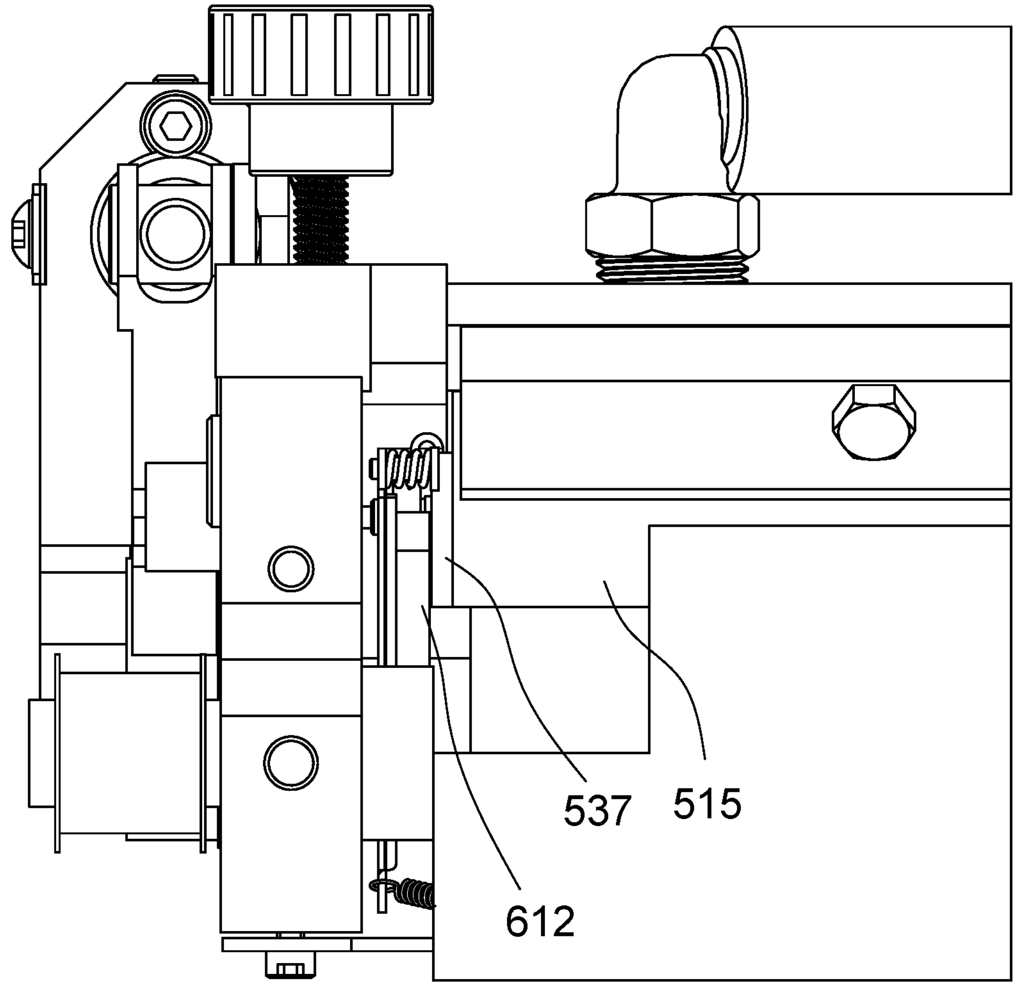
FIG. 11 is a partial rear view of a coating unit according to some embodiments.
Figure 12:
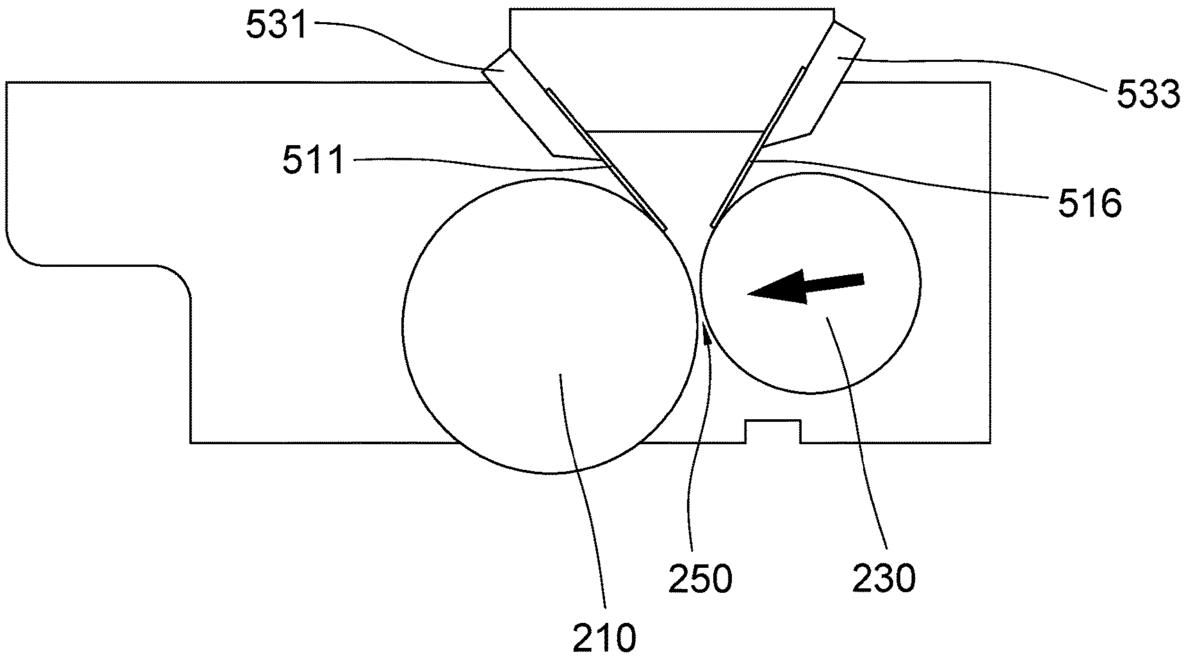
FIG. 12 is a schematic view of a coating unit according to some embodiments.

FIG. 5 is a perspective view of a part of the coating unit 110 according to some embodiments omitting certain components, such as the support 333 and the gears 335, for clarity. FIG. 6 is a side view of a part of the coating unit 110 according to some embodiments, similarly omitting components for clarity. FIG. 7 is a side view of a part of the coating unit 110 according to some embodiments, and is a view omitting a sealing component 611 in FIG. 6. FIG. 8 is a cross sectional view taken along line VIII-VIII in FIG. 2. FIG. 9 is a partially exploded side view of the coating unit 110 according to some embodiments. FIG. 10 is a partially exploded side view of the coating unit 110 according to some embodiments. FIG. 11 is a partial rear view of a coating unit according to some embodiments. FIG. 12 is a schematic view of the coating unit 110 according to some embodiments.

With reference to FIGS. 3 and 5-8, the coating form roller 210 may be rotatably supported between the supports 333. The metering roller 230 may be rotatably supported between the supports 333 and may be adjacent to the coating form roller 210. In the illustrated example shown in FIG. 8, the coating form roller 210 may be smaller in diameter than the coating form roller 210. In other examples, the coating form roller 210 may be the same or greater in diameter than the coating form roller 210. In some embodiments, the metering roller 210 may be a hard surface roller, which may be a roller that has a harder surface than the coating form roller 210. The metering roller 210 may be an anilox roller, or may be a roller that is made of other materials. In some embodiments, the metering roller 230 may be driven by a gear 335 (see FIGS. 2 and 3) that engages with another gear 335 of the coating form roller 210.

As shown in FIGS. 4 and 8, there is a nip 250, or a pinch point, between the coating form roller 210 and the metering roller 230. As shown in FIG. 3, the coating form roller 210 may include a first end 2101 and a second end 2102. The first end 2101 and the second end 2102 are spaced in an axial direction (i.e., the direction X1 in the drawing) of each of the coating form roller 210 and the metering roller 230. The metering roller 230 may include a first end 2301 and a second end 2302. The first end 2301 and the second end 2302 are spaced in the direction X1. As such, the form roller 210 and the metering roller 230 each extend in the axial direction X1, and have parallel rotational axes. The nip 250 runs parallel to the form roller 210 and the metering roller 230 and extends in the axial direction X1.

With reference to FIG. 2, in some embodiments, the metering system 311 may be configured to control pressure between the coating form roller 210 and the metering roller 230 such that a thickness of coating solution around the coating form roller 210 is thereby controlled by characteristics of the nip 250.

With reference to FIGS. 3-8, the sealing chamber 500 may be located above the coating form roller 210 and the metering roller 230. The sealing chamber 500 may be configured to create a sealed environment among the sealing chamber 500, the coating form roller 210, and the metering roller 230. An actual configuration of the sealing chamber 500 may be realized in various ways, and some embodiments of the sealing chamber 500 are described below.

In some embodiments, the sealing chamber 500 may include a first blade 511, a second blade 516, a first blade clamp 531, a second blade clamp 533, a first end seal 535, a second end seal 537, and a chamber body 538.

With reference to FIGS. 3-8 and 11, and specifically FIGS. 8 and 11, the first blade 511 may engage with the coating form roller 210. In some embodiment, the first blade 511 may be tangential to the coating form roller 210. The first blade 511 may extend along the axial direction (i.e., the direction X1 in the embodiment) of the coating roller 210. As shown in FIG. 8, the first blade 511 may be tilted from a vertical direction (i.e., the direction X2 in the embodiment) by an angle 511*a*

With reference to FIGS. 3-8 and 11, the second blade 516 may engage with the metering roller 230. In some embodiment, the second blade 516 may tangential to the metering roller 230. The second blade 516 may extend along the direction X1. As shown in FIG. 8, the second blade 516 may be tilted to the first blade 511. The second blade 516 may be tilted from a vertical direction (i.e., the direction X2 in the embodiment) by an angle 516*a*.

The angles 511*a* and 516*a* may be specific angles depending upon, and/or defined by, the diameters of the coating form roller 210 and the metering roller 230. For example, in some embodiments, the blades 511, 516 may rest on the respective rollers 210, 230, such that when the rollers move, the angles of the corresponding blades adjust. In some embodiments, the diameters of the coating form roller 210 and the metering roller 230 may be different, and the resulting angles 511*a* and 516*a* may be different. In the illustrated example, the diameter of the coating form roller 210 is greater than the diameter of the metering roller 230, and the angle 511*a* is greater than the angle 516*a*. In other embodiments, the diameters of the coating form roller 210 and the metering roller 230 may be the same, and the angles 511*a* and 516*a* may be the same. In some embodiments, the angles 511*a* and 516*a* may be, but are not limited to, 20-70 degrees.

With reference to FIG. 8, the first blade 511 and the second blade 516 may form an opening 520, which may be a linear opening adjacent the nip 250 between the coating form roller 210 and the metering roller 230. The opening 520 may extend along the direction X1. Accordingly, and interior of the sealing chamber 500 may be defined at least partially by the first and second blades 511 and 516, the coating form roller 210, and the metering roller 230, and those components may thereby seal the sealing chamber 500.

With reference to FIGS. 3 and 8, the first blade clamp 531 and the second blade clamp 533 may similarly extend along the direction X1. In some embodiments, the first blade clamp 531 and the second blade clamp 533 may function as a retention mechanism by which the first and second blades 511 and 516 are retained by the chamber body 538. In the illustrated example, the first blade 511 is provided on the first blade clamp 531, and the second blade 516 is provided on the second blade clamp 533. With reference to FIGS. 3 and 7, the first end seal 535 may be on the coating form roller 210 and the metering roller 230 and at an end of the sealing chamber 500. The first end seal 535 may be located at the first end 513 and 517 of each of the first blade 511 and the second blade 516. The first end seal 535 may contact each of the coating form roller 210 and the metering roller 230. Similarly, the second end seal 537 may be on the coating form roller 210 and the metering roller 230 and at another end of the sealing chamber 500. The second end seal 537 may be located at the second end 515 and 518 of each of the first blade 511 and the second blade 516. The second end seal 537 may contact each of the coating form roller 210 and the metering roller 230. Each of the second end seal 537 and the first end seal 535 may seal the first blade 511 to the second blade 516 thereby forming a trough 591 (see FIG. 8) defined by the end seals 535 and 537, the first blade 511, and the second blade 516. In some embodiments, the first end seal 535, the second end seal 537, the first and second blades 511 and 516, the coating form roller 210, and the metering roller 230 may seal the sealing chamber 500.

In some embodiments, with reference to FIG. 3, the sealing chamber 500 may include a first outer end seal 611 and a second send seal 612. The first outer end seal 611 may be located at the first end 2101 of the coating form roller 210, and on the radial surface of the metering roller 230 at the first end 2301. The second outer end seal 612 may be located at the first end 2102 of the coating form roller 210, and on the radial surface of the metering roller 230 at the first end 2302. In some embodiments, at least one spring may be provided to press the first outer end seal 611 and the second send seal 612 to the radial surface of the metering roller 230 and the end surface of the coating form roller 210. Such a spring may be, for example, a torsional spring.

Each of the first outer end seal 611 and the second send seal 612 may seal the coating form roller 210 to the metering roller 230 thereby forming a lower chamber 592 (see FIG. 8) below the trough 591. The trough 591 may have a lower opening (e.g., the opening 520) between the first blade 511 and the second blade 516 extending in the axial direction (i.e., direction X1), such that coating solution in the trough 591 passes through the lower opening (e.g., the opening 520) to the lower chamber 592.

With reference to FIGS. 3-8, an upper portion of the chamber, referred to herein as a chamber body 538, may similarly extend along the direction X1. In the illustrated example, the first blade clamp 531 and the second blade clamp 533 may be attached to the chamber body 538. As such, the blade clamps 531, 533 may be fixed to the chamber body 538 and may connect the blades 511, 516 to such chamber body to further define the sealing chamber.

With reference to FIGS. 2 and 3, in some embodiments, the sealing chamber 500 may include at least one fluid port 550. In the illustrated example, three fluid ports 550 are formed on the sealing chamber 500. The fluid ports 550 may be formed on the top of the chamber body 538, but the fluid ports may be formed at any other location.

In some embodiments, as shown in FIG. 1, the system 101 may include a pumping system 700. The pumping system 700 may be fluidly connected to the sealing chamber 500 via the fluid ports 550. In the illustrated example, the pumping system 700 includes a first pump 710 and a second pump 720. The first pump 710 may be configured to feed coating solution into the sealing chamber 500 from a container 780 via a fluid path 691. The fluid path 691 may be fluidly connected to the fluid port 551 of the fluid ports 550. The second pump 720 may be configured to suck coating solution from the sealing chamber 500 into the container 780 via a fluid path 692. In the illustrated example, the fluid path 692 may be fluidly connected to two fluid ports 552 and 553 of the fluid ports 550. By using the pumping system 700, the solution may be recirculated between the sealing chamber 500 and the container 780. While the number of pumps shown are two, the embodiments are not so limited and only one or more than two pumps may be similarly provided. In operation of the system 101, the coating solution is provided in the space on the coating form roller 210 and the metering roller 230, which are being rotated in opposite directions. The pressure between the coating form roller 210 and the metering roller 230 can determine the thickness of the coating solution on the coating form roller 210, and the coating solution can be transferred to another component.

In some embodiments, cleaning of the sealing chamber 500 can be performed as follows. The system 101 can utilize a vacuum device or Fluid Handling Apparatus for Maintaining Lithographic Presses (disclosed in U.S. Pat. No. 5,539,952 to Hayes, which is incorporated by reference in its entirety herein) for evacuating the coating/cleaner solution from the nip 250 between the coating form roller 210 and the metering roller 230. For cleaning the sealing chamber 500 (e.g., a chambered doctor blade system), a series of pumps is utilized to inject cleaning fluid to flush out the existing coating solution to expedite clean-up or coating changes. In some embodiments, the sealing chamber 500 may contains a vacuum port (which may be the fluid port 550) for evacuating residual coating solution left in the sealing chamber 500 prior to removal. The vacuum system can utilize an automatic feature which uses the touchscreen control to coordinate a series of pumps and valves to inject cleaning fluid to flush out the existing coating solution and the vacuum system for final clean-up. The cleaning process that is described here is one example, and other cleaning processes may be used.

According to the present disclosure, the system 101 may include the sealing chamber 500. The sealing chamber 500 may include the first and second blades 511 and 516 that engage with the coating form roller 210 and the metering roller 230, respectively. As such, the present disclosure can provide a new system that is used for applying coating solution. In some embodiments, the system 101 may prevent the coating solution on a roller (e.g., the metering roller 230) from drying when the system is operated, by storing the coating solution in the sealing chamber 500. In some embodiments, the first and second blades 511 and 516 may effectively enclose the coating solution on the coating form roller 210 and the metering roller 230.

In addition, according to the present disclosure, the first end seal 535 and the second end seal 537 with the first and second blades 511 and 516, the coating form roller 210, and the metering roller 230 may seal the sealing chamber 500. This configuration may effectively enclose the coating solution on the coating form roller 210 and the metering roller 230.

According to the present disclosure, the system 101 may include the first outer end seal 611. The first outer end seal 611 may effectively enclose the coating solution on the coating form roller 210 and the metering roller 230. The first outer end seal 611 may be located at the first end 2101 of the coating form roller 210, and on the radius of the metering roller 230. Similarly, the system 101 may include the second outer end seal 612. The second outer end seal 612 may effectively enclose the coating solution on the coating form roller 210 and the metering roller 230. The second outer end seal 612 may be located at the first end 2102 of the coating form roller 210, and on the radius of the metering roller 230.

According to the present disclosure, the system 101 may include the metering system 311 configured to control pressure between the coating form roller 210 and the metering roller 230 such that a thickness of coating solution around the coating form roller 210 is controlled. As such, the metering system 311 allows for a wide variation of the coating film thicknesses.

According to the present disclosure, the system 101 may include a pumping system 700 fluidly connected to the sealing chamber 500. Therefore, the amount of the coating solution in the sealing chamber 500 can be adjusted to prevent coating starvation in the sealing chamber 500 and/or to prevent leaking from the sealing chamber 500.

According to the present disclosure, the pumping system 700 may include the first pump 710 and the second pump 720. The first pump 710 may be configured to feed coating solution into the sealing chamber 500 from the container 780, and the second pump 720 may be configured to suck coating solution from the sealing chamber 500 into the container 780. Thus, the coating solution may be recirculated between the sealing chamber 500 and the container 780 via the first pump 710 and the second pump 720. By adjusting the first pump 710 and the second pump 720, the optimum flow rate of the coating solution may be realized to prevent coating starvation in the sealing chamber 500 and/or to prevent leaking from the sealing chamber 500.

Further, in some embodiment, the entire coating module (e.g., the unit 110) can be configured as a cassette for easy removal for cleaning or changing to different coating units.

Figure 13:
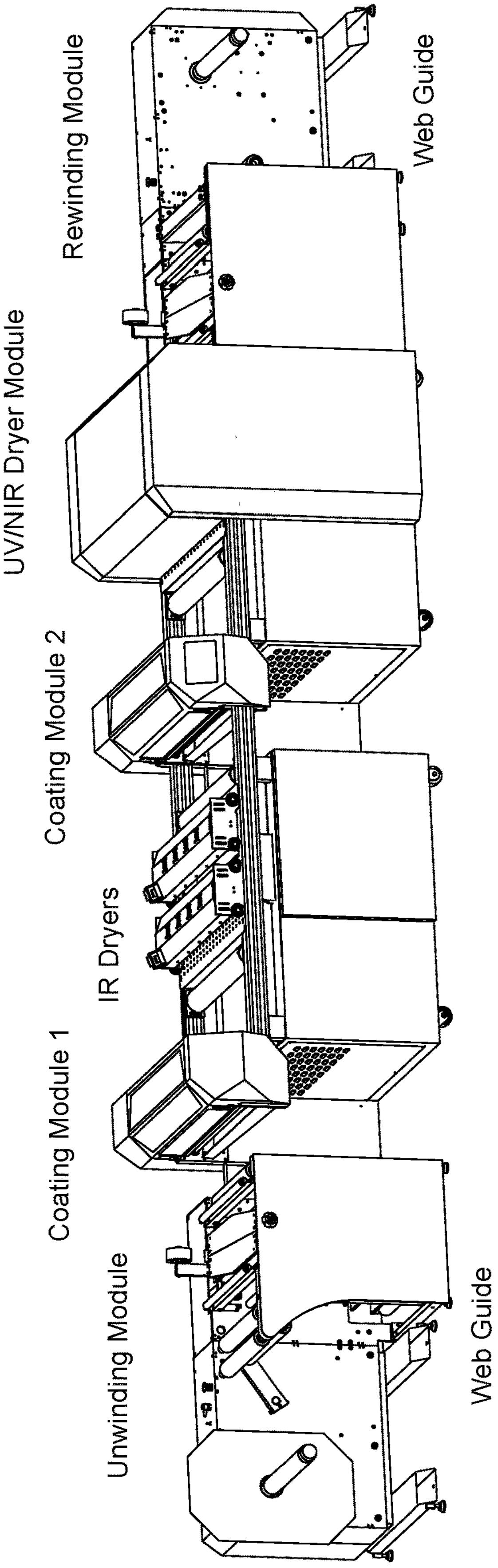
FIG. 13 illustrates one embodiment of a roll-based coating machine for application of primers and coatings for inkjet printing and heat seal barrier coating for packaging.
Figure 14:
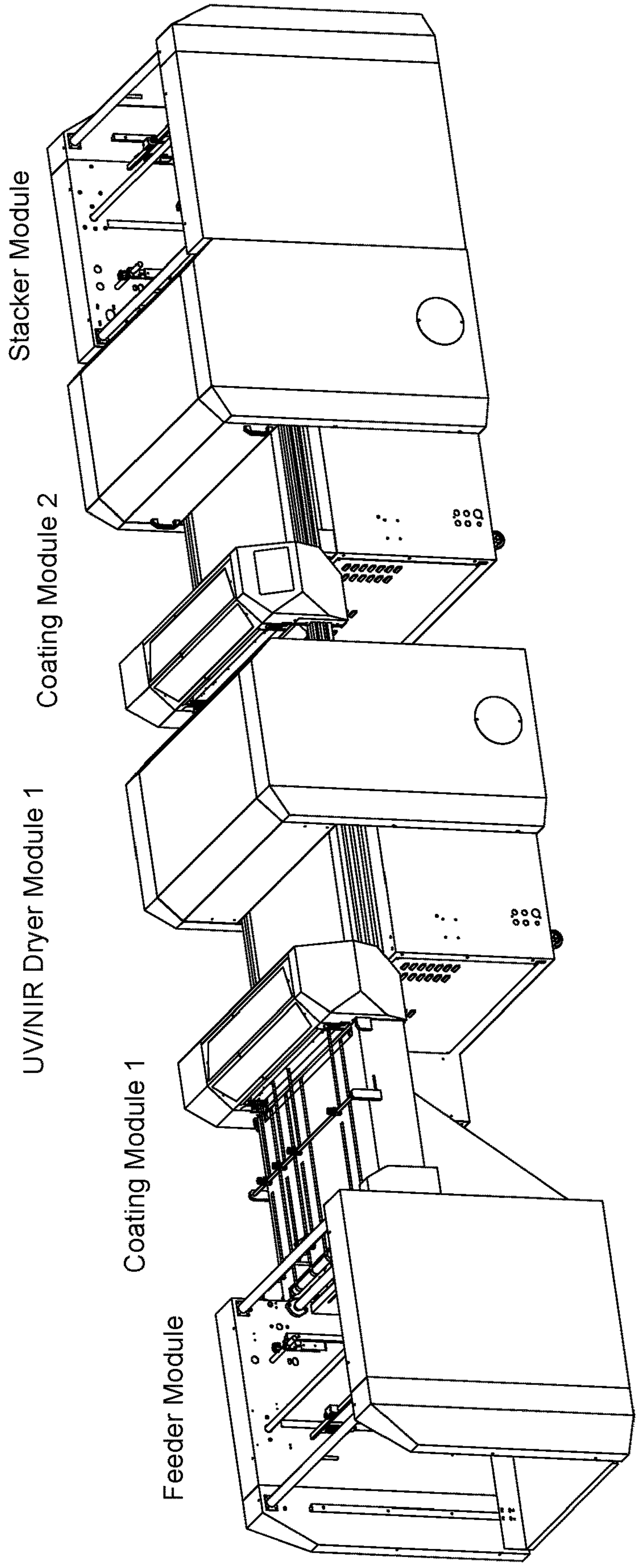
FIG. 14 illustrates one embodiment of a sheet-based coating machine for application of primers and coatings for inkjet printing and heat seal barrier coating for packaging.

FIG. 13 illustrates one embodiment of a roll-based coating machine for application of primers and coatings for inkjet printing and heat seal barrier coating for packaging. FIG. 14 illustrates one embodiment of a sheet-based coating machine for application of primers and coatings for inkjet printing and heat seal barrier coating for packaging. In some embodiments, the system 101 described with reference to FIGS. 1-12 may be employed in a coating module in each coating machine shown in FIGS. 13 and 14. However, other coating modules different from the system 101 described with reference to FIGS. 1-12 may be used in each coating machine shown in FIGS. 13 and 14.

One embodiment of the present disclosure discloses a coating machine with feeding devices for rolls (FIG. 13, for example) or sheets (FIG. 14, for example) of substrates. Sheet feeders and stackers are utilized to transport the sheeted substrates. Unwind and rewind systems with one or more web guides are used to transport roll-fed substrates. These systems can be pre-set per job. The modular system can be configured in a variety of ways for each specific application. One or several coating application modules can be utilized which contain a two-roll seal type dampener (Coater) (examples disclosed in U.S. Pat. No. 3,769,909 to Fugman, et al., which is incorporated by reference in its entirety herein, and U.S. Pat. No. 4,455,398 to Loudon, which is incorporated by reference in its entirety herein). One embodiment of the present system utilizes a one-way feed of coating/primer to the coating nip. One embodiment of the present system utilizes a two-roll system that utilizes a torsion compression spring sealing system, which creates a dam effect for the coating/priming liquid. The system can be adjusted via servo motors controlling the coating film thickness via a metering device. The coater also can be configured with a modular chambered anilox system which sits above the two-roll system for use of the anilox coater, depending upon the job requirements (typically requires for higher coating thicknesses). The chambered anilox system recirculates the coating through the chamber and back to the coating/primer container. Sensors are arranged above the substrate to read the coating film thickness and feed back to control system to the servo drives, making adjustments and keeping the film thickness constant. These sensors can also send feedback to a moisture apparatus that reduces the viscosity of the coating/primer in the coating unit (for the two-roll system) or to the coating/primer container, to keep film thickness consistent. Coater container mixers can also be integrated for consistency of the coating/primer. Coating/Primer levels are monitored by the system via sensors to track usage and send an alarm when the level becomes too low.

Cleaning of the equipment is important to the operation. One embodiment of the system of the present disclosure utilizes a movable coating module(s) which can be moved away from the impression roller(s) for easy cleaning. A quick release doctor blade system is incorporated to clean the impression roller and is easily removed for cleaning or changing the doctor blade. One embodiment of the system of the present disclosure utilizes a venturi vacuum system for evacuating the coating/priming liquid from the nip of the two-roll system or from the chambered anilox system to expedite clean-up or coating changes. The vacuum system of the embodiment of the present disclosure can utilize an automatic feature which uses a vacuum tube mounted to an air cylinder which protrudes into the coater nip, removing the liquid, then injecting cleaning fluid via another tube. The system is turned on to clean the rollers, then stops for the vacuum process. The entire coating module is mounted on linear bearings and can easily be removed for cleaning or to change to a different roller type. The coating system also utilizes sensors to monitor substrates entering the coater to prevent them from wrapping around the coater rollers creating damage and waste. When a wrap occurs an emergency stop is initiated, a beacon lights and an alarm is sounded.

The coating machine of one embodiment of the present disclosure utilizes multiple modular curing and drying systems to cure or dry the coatings/primers. One or more modular infrared (IR) dryers with short wave infrared bulbs or NIR Dryers may be configured diagonally for consistent drying across the substrate, near infrared dryers and ultraviolet (UV) reactors provide heat and UV radiation for the process. The UV bulb reflector rotates ninety degrees and decreases bulb intensity to the minimum when a guard is opened or the machine stops. One or more air curtains can be used to evacuate moisture in the drying process. Sensors are mounted above the substrate to read if the substrate is dry. A control system monitors this and feeds back to the dryers/UV reactors to automatically adjust intensities for consistent dryer/curing. These systems can also be pre-set per specific jobs to save on make-ready time. Sensors are placed throughout the coating machine to detect sheet jams and prevent the chance of fire from the IR dryers or UV reactors. When a jam occurs an emergency stop is initiated, a beacon lights and an alarm is sounded.

While the present disclosure has been described at some length and with some particularity with respect to the several described embodiments, it is not intended that it should be limited to any such particulars or embodiments or any particular embodiment, but it is to be construed with references to the appended claims so as to provide the broadest possible interpretation of such claims in view of the prior art and, therefore, to effectively encompass the intended scope of the disclosure.

While all examples and conditional language recited herein are intended for pedagogical purposes to aid the reader in understanding the principles of the disclosure and the concepts contributed by the inventor to furthering the art, and are to be construed as being without limitation to such specifically recited examples and conditions. Moreover, all statements herein reciting principles, aspects, and embodiments of the disclosure, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

What is claimed is:

1. A system, comprising:

a coating form roller;

a metering roller adjacent to the coating form roller; and a sealing chamber comprising first and second blades that engage with the coating form roller and the metering roller, respectively, wherein the first blade is tilted to the second blade, and wherein at least partially between the coating form roller and the metering roller, a distance between the first and second blades decreases toward a nip between the coating form roller and the metering roller.

2. The system of claim 1, wherein the first and second blades, the coating form roller, and the metering roller seal the sealing chamber.

3. The system of claim 1, wherein the first blade and the second blade form a linear opening extending along the nip between the coating form roller and the metering roller.

4. The system of claim 1, wherein the sealing chamber further comprises a first end seal on the coating form roller and the metering roller and at a first end of the sealing chamber.

5. The system of claim 4, wherein the sealing chamber further comprises a second end seal on the coating form roller and the metering roller and at a second end of the sealing chamber opposite the first end.

6. The system of claim 1, wherein the sealing chamber includes a first blade clamp and a second blade clamp that extend along an axis direction of the coating form roller, and the first blade is provided on the first blade clamp, and the second blade is provided on the second blade clamp.

7. The system of claim 6, wherein the sealing chamber includes a chamber body that extends along the axial direction.

8. The system of claim 1, further comprising at least one pump fluidly connected to the sealing chamber.

9. The system of claim 8, wherein the at least one pump includes:

a first pump configured to feed coating solution into the sealing chamber from a container, and a second pump configured to suck coating solution from the sealing chamber into the container.

10. The system of claim 8, wherein the sealing chamber includes at least one fluid port, and the at least one pump is fluidly connected to the sealing chamber via the at least one fluid port.

11. The system of claim 1, wherein the metering roller is an anilox roller.

12. The system of claim 1, wherein the sealing chamber is defined at least partially by the first and second blades, the coating form roller, the metering roller, and at least one end seal contacting each of the coating form roller and the metering roller.

13. The system of claim 12, wherein the sealing chamber is further defined by a chamber body, the chamber body including at least one clamp, the first and second blades being retained with the at least one clamp by the chamber body.

14. The system of claim 12, wherein the sealing chamber has a first end and a second end in an axial direction, and wherein the at least one end seal comprises:

an end seal at each of the first and second end sealing the first blade to the second blade thereby forming a trough defined by the end seals, the first blade, and the second blade; and an outer end seal at each of the first and second end sealing the coating form roller to the metering roller thereby forming a lower chamber below the trough;

wherein the trough has a lower opening between the first blade and the second blade extending in the axial direction, such that coating solution in the trough passes through the lower opening to the lower chamber.

15. The system of claim 1, wherein each of the first blade and the second blade is tilted to a vertical direction at angles depending upon diameters of the coating form roller and the metering roller.

16. The system of claim 1, wherein the first blade and the second blade are tilted to a vertical direction at different angles, and diameters of the coating form roller and the metering roller are different.

17. The system of claim 1, wherein the sealing chamber comprises a first outer end seal located at a first end of the coating form roller, and sealing against a radial surface of the metering roller.

18. The system of claim 17, wherein the sealing chamber comprises a second outer end seal that is located at a second end of the coating form roller, and sealing against a radial surface of the metering roller.

19. The system of claim 1, further comprising at least one end seal contacting each of the coating form roller and the metering roller, wherein the sealing chamber is defined at least partially by:

the first and second blades, wherein the first blade is tangential to the coating form roller, and the second blade is tangential to the metering roller;

the coating form roller;

the metering roller; and the at least one end seal.

20. A system, comprising:

a coating form roller;

a metering roller adjacent to the coating form roller;

at least one end seal contacting each of the coating form roller and the metering roller; and a sealing chamber comprising first and second blades, the sealing chamber being defined at least partially by:

the first and second blades, wherein the first blade is tilted to the second blade, and wherein at least partially between the coating form roller and the metering roller, a distance between the first and second blades decreases toward a nip between the coating form roller and the metering roller, and wherein the first blade is tangential to the coating form roller, and the second blade is tangential to the metering roller;

the coating form roller;

the metering roller; and the at least one end seal.

21. A system, comprising:

a coating form roller;

a metering roller adjacent to the coating form roller; and a sealing chamber comprising first and second blades that engage with the coating form roller and the metering roller, respectively, wherein the sealing chamber has a first end and a second end in an axial direction, wherein the system further comprises:

an outer end seal at each of the first and second end sealing the coating form roller to the metering roller, and wherein the outer end seal at each of the first and second ends is pressed against a corresponding end of the coating form roller and is pressed against a corresponding radial surface of the metering roller by a torsional spring.

* * * * *